United States Patent
Suh et al.

(10) Patent No.: US 8,668,845 B2
(45) Date of Patent: *Mar. 11, 2014

(54) METHOD FOR PREPARING ELECTROSTATIC DISSIPATIVE POLYMER

(75) Inventors: Chang-Min Suh, Kyunggi-Do (KR); Tae-Woong Lee, Kyunggi-Do (KR); Dong-Sik Kim, Seoul (KR)

(73) Assignee: Lubrizol Advanced Materials, Inc., Cleveland, OH (US)

( * ) Notice: Subject to any disclaimer, the term of this patent is extended or adjusted under 35 U.S.C. 154(b) by 302 days.

This patent is subject to a terminal disclaimer.

(21) Appl. No.: 12/910,219

(22) Filed: Oct. 22, 2010

(65) Prior Publication Data

US 2011/0031442 A1    Feb. 10, 2011

Related U.S. Application Data

(63) Continuation of application No. 11/039,972, filed on Jan. 21, 2005, now Pat. No. 8,545,728.

(30) Foreign Application Priority Data

Mar. 8, 2004    (KR) .................. 10-2004-0015530

(51) Int. Cl.
*H01B 1/00*    (2006.01)
*C08K 3/10*    (2006.01)
*C08K 3/30*    (2006.01)

(52) U.S. Cl.
USPC ........ 252/500; 252/511; 252/519.4; 524/157; 524/167; 524/168; 524/910

(58) Field of Classification Search
USPC ............. 252/500, 511, 519.3, 8.81, 8.61; 524/157, 167, 199, 910, 419, 418; 528/44, 57, 67, 75
See application file for complete search history.

(56) References Cited

U.S. PATENT DOCUMENTS

| | | | |
|---|---|---|---|
| 3,577,358 A | 5/1971 | Santelli et al. | |
| 3,678,129 A | 7/1972 | Fischer | |
| 4,526,952 A * | 7/1985 | Zeitler et al. | 524/496 |
| 6,140,405 A | 10/2000 | Eckstein et al. | |
| 6,284,839 B1 | 9/2001 | Fahey et al. | |
| 7,375,150 B2 * | 5/2008 | Fujihana | 524/167 |
| 2001/0034390 A1 * | 10/2001 | Okubo et al. | 524/157 |
| 2003/0183810 A1 | 10/2003 | Fujihana et al. | |
| 2004/0175573 A1 | 9/2004 | Fujihana | |

FOREIGN PATENT DOCUMENTS

| | | | | |
|---|---|---|---|---|
| WO | 01/79354 A1 | 10/2001 | | |
| WO | WO 03/011973 | * 2/2003 | ............ | G03C 1/85 |

* cited by examiner

*Primary Examiner* — Stanley Silverman
*Assistant Examiner* — Kallambella Vijayakumar
(74) *Attorney, Agent, or Firm* — Christopher D. Hilker

(57) ABSTRACT

A method for preparing an electrostatic dissipative polymer and a blend of a thermoplastic polymer and the ESD polymer is disclosed. The method for preparing an electrostatic dissipative polymer includes the step of polymerizing the electrostatic dissipative polymer in the presence of a reactive solvent and lithium salt dissolved in the reactive solvent, wherein the amount of the reactive solvent is from 0.1 to 20 weight parts based on 100 weight parts of the produced electrostatic dissipative polymer, the amount of lithium salt is from 0.1 to 5 weight parts based on 100 weight parts of the produced electrostatic dissipative polymer, and the reactive solvent is aliphatic glycol having from 2 to 8 carbon atoms and having a primary alcohol group, or aromatic glycol having from 6 to 10 carbon atoms.

9 Claims, No Drawings

METHOD FOR PREPARING ELECTROSTATIC DISSIPATIVE POLYMER

This application is a continuation of prior application U.S. Ser. No. 11/039,972 filed 21 Jan. 2005, now U.S. Pat. 8,545,728, and claims benefit of said prior application.

This application claims priority of pending Korean Patent Application No. 2004-15530 filed on Mar. 8, 2004.

FIELD OF THE INVENTION

This invention relates to a method for preparing an electrostatic dissipative polymer, and more particularly, to a method for preparing an electrostatic dissipative (ESD) polymer and a blend of a thermoplastic polymer and the ESD polymer. In the present invention, the generation of organic compounds during or after processing the ESD polymer and the blend is minimized by properly selecting lithium salt for improving the electrostatic dissipative properties of the polymer, and reactive solvent for dissipating the lithium salt in the polymer.

BACKGROUND OF THE INVENTION

The conductive polymers, which are widely used for antistatic materials, are classified into ionic conductive polymers and electrical conductive polymers. The surface resistivity of the conventional conductive polymers is generally from $1 \times 10^4$ to $1 \times 10^{12}$ Ω/square when measured in accordance with ASTM D-257. In such conventional conductive polymers, lithium salt is incorporated into the polymers for improving the electrostatic dissipative properties of the polymers, and the incorporation of the lithium salt is carried out while the lithium salt is being dissolved in an electrolyte solvent. However, in case of using the conventional electrolyte solvent, the electrolyte solvent is liable to be eluted from the polymer when the polymer is processed or handled at high temperature or when the polymer is used for long time. The eluted solvent can be adsorbed to a product packaged by the polymer, and deteriorates the properties of the packaged product.

SUMMARY OF THE INVENTION

According to the wide research by the present inventors on the conventional ESD polymer, the conventional ESD polymer, for example, disclosed in U.S. Pat. Nos. 6,140,405 and 6,284,839 has a desirable electrostatic dissipative property, but is degraded when processed at high temperature, which results in the elution of the electrolyte solvent used for dissolving the lithium salt, and various other organic compounds. In addition, when the conventional ESD polymer is used for long time, the electrolyte solvent and various other organic compounds are also liable to be eluted from the polymer, which deteriorates the properties of the packaged product. After wide research on the reactive solvent which is capable of dissolving the lithium salt and does not have the above-mentioned disadvantages, the present inventors have found that the similar or superior electrostatic dissipative property can be obtained, and the elution of the electrolyte solvent and various other organic compounds can be minimized when a glycol compound, such as ethyleneglycol ($C_2H_6O_2$), is used as the reactive solvent for dissolving the lithium salt, such as lithium (bis)perfluoroethanesulfonimide ($LiN(SO_2C_2F_5)_2$).

Therefore, it is an object of the present invention to provide a method for preparing ESD polymer which is capable of minimizing the elution of organic compounds during or after processing of the ESD polymer. It is other object of the present invention to provide a method for preparing ESD polymer having improved packaging property and processability. It is another object of the present invention to provide a method for preparing ESD polymer having superior electrical conductivity. It is yet another object of the present invention to provide a method for preparing a blend of a thermoplastic polymer and the ESD polymers.

In order to achieve these and other objects, the present invention provides a method for preparing an electrostatic dissipative polymer, which comprises the step of polymerizing the electrostatic dissipative polymer in the presence of a reactive solvent and lithium salt dissolved in the reactive solvent, wherein the amount of the reactive solvent is from 0.1 to 20 weight parts based on 100, weight parts of the produced electrostatic dissipative (ESD) polymer, the amount of lithium salt is from 0.1 to 5 weight parts based on 100 weight parts of the produced ESD polymer, and the reactive solvent is aliphatic glycol having from 2 to 8 carbon atoms and a primary alcohol group, or aromatic glycol having from 6 to 10 carbon atoms. The preferable ESD polymer includes polyurethane, glycol modified polyethyleneterephthalate, polypropylene, polyethylene, polystyrene, polyvinyl chloride, polyester, acrylonitrile-butadiene-styrene or the mixtures thereof, and the blend can be produced by blending the electrostatic dissipative polymer with a thermoplastic polymer. The preferable reactive solvent includes a solvent selected from the group consisting of ethyleneglycol, diethyleneglycol, 1,3-propanediol, 1,4-butanediol, 1,5-pentanediol, 1,4-cyclohexanedimethanol, hydroquinone bis(di-hydroxyethyl)ether, 1,6-hexanediol and the mixtures thereof.

DETAILED DESCRIPTION OF THE INVENTION

A more complete appreciation of the invention, and many of the attendant advantages thereof, can be better appreciated by reference to the following detailed description. In the following detailed description, polyurethane and the method for preparing the same will be described as a representative example of the electrostatic dissipative polymer. However, the electrostatic dissipative polymer of the present invention is not limited to polyurethane.

Polyurethane is widely used as an antistatic material due to its good electrical conductivity, and can be produced by reacting polyethyleneglycol (PEG), diisocyanate, and a chain extender. Preferable polyethyleneglycol for the present invention is a linear polymer of chemical formula $H-(OCH_2CH_2)_n-OH$, wherein n is a number of repeating unit, and is from about 11 to 110. The weight average molecular weight of polyethyleneglycol is preferably from about 500 to about 5,000, and more preferably from about 600 to about 4,000. Preferable diisocyanate is aromatic or aliphatic diisocyanate, and includes 1,4-diisocyanatobenzene (PPDI), 4,4'-methylene-bis(phenylisocyanate) (MDI), 1,5-naphthalene diisocyanate (NDI), m-xylene diisocyanate (XDI), 1,4-cyclohexyl diisocyanate (CHDI), and so on. The more preferable diisocyanate for the present invention is 4,4'-methylene- bis (phenylisocyanate). The chain extender can be aliphatic glycol having from 2 to 8 carbon atoms and a primary alcohol group, or aromatic glycol having from 6 to 10 carbon atoms. Preferred chain extender includes diethyleneglycol, 1,3-propanediol, 1,4-butanediol, 1,5-pentanediol, 1,4-cyclohexanedimethanol, hydroquinone bis(di-hydroxyethyl)ether, 1,6-hexanediol and the mixtures thereof, and more preferred chain extender for the present invention is 1,4-butanediol.

Polyurethane according to the present invention can be prepared by one-shot polymerization process, wherein polyethyleneglycol, the chain extender and diisocyanate are reacted simultaneously or substantially simultaneously at a temperature of more than 100° C., and usually at more than 120° C. The amount of the chain extender can be from about 0.1 to about 15.0 moles, and preferably from about 0.2 to about 6.1 moles for 1 mole of polyethyleneglycol, and the amount of diisocyanate can be from about 0.97 to about 1.02 moles, and preferably about 1.0 mole for total 1.0 moles of chain extender and polyethyleneglycol. If the amount of the chain extender is less than about 0.1 mole for 1 mole of polyethyleneglycol, reactivity of the reactants is reduced and polyurethane may not be produced properly. If the amount of the chain extender is more than 15.0 mole, electrical properties of polyurethane can be deteriorated. The temperature of the polymerization reaction is usually from about 180 to about 250° C., and the weight average molecular weight of the produced polyurethane is from about 150,000 to about 350,000. Generally, polyurethane has a good electrical and ion conductivity because polyurethane is a hydrophilic polymer and includes polar polyethyleneglycol. Furthermore, polyurethane has advantages in that the application areas are very wide, processing condition, for example, molding condition can be widely varied, production cost is low, and recycling is easy. However, the conductivity of polyurethane generally decreases in low humidity conditions.

In order to overcome the above-mentioned shortcoming, to effectively dissipate static electricity and to improve conductivity, polyurethane according to the present invention includes salts, salt complex, or salt compound. Preferable salt for the present invention is lithium salt, and exemplary lithium salt includes $LiN(SO_2C_2F_5)_2$, $LiClO_4$, $LiN(CF_3SO_2)_2$, $LiPF_6$, $LiAsF_6$, LiI, LiBr, LiSCN, $LiSO_3CF_3$, $LiNO_3$, $LiC(SO_2CF_3)_3$, $Li_2S$, $LiMR_4$, or the mixtures thereof, wherein M is Al or B, R is halogen, alkyl or aryl group. The more preferred salt is lithium(bis)perfluoroethanesulfonimide ($LiN(SO_2C_2F_5)_2$). Such salt compound is added to the polymerization reaction reacting polyethyleneglycol, diisocyanate and chain extender to produce polyurethane in which the salt is uniformly distributed. The preferable amount of the salt added to the one-shot polymerization is from about 0.1 to about 5 weight parts based on 100 weight parts of the produced electrostatic dissipative polymer. When the amount of salt is less than 0.1 weight parts based on 100 weight parts of the polymer, the static electricity on the polymer cannot be desirably dissipated, and the conductivity may not desirably increase. On the contrary, when the amount of salt is more than 5 weight parts, the physical properties of polyurethane can be deteriorated.

Conventionally, an electrolyte solvent is used for dissolving the lithium salt. Exemplary conventional electrolyte solvent includes ethylene carbonate, propylene carbonate, dimethylsulfoxide, tetramethylenesulfone, tri- or tetraethyleneglycol dimethylether, gamma-butyrolactone, and N-methyl-2-pyrrolidone, and the effective amount of the electrolytic solvent is from about 0.1 to about 20 weight parts based on 100 weight parts of the polymer. However, in case of using the electrolyte solvent for dissolving the lithium salt, the electrolyte solvent can be eluted from the polymer during or after the processing of the polymer at high temperature, or when the polymer is used for long time. The processing of the polymer includes molding process, blowing process, extrusion molding process, and so on. The eluted electrolyte solvent can be adsorbed to a product packaged with the polymer, and deteriorates the properties of the packaged product. Therefore, in the present invention, the reactive solvent for urethane polymerization is used for dissolving the lithium salt. The preferable reactive solvent is aliphatic glycol having from 2 to 8 carbon atoms, preferably 2 to 6 carbon atoms, and having a primary alcohol group, or aromatic glycol having 6 to 10 carbon atoms. Exemplary reactive solvent includes a solvent selected from the group consisting of ethyleneglycol ($C_2H_6O_2$), diethyleneglycol, 1,3-propanediol, 1,4-butanediol, 1,5-pentanediol, 1,4-cyclohexanedimethanol, hydroquinone bis(di-hydroxyethyl)ether, 1,6-hexanediol and the mixtures thereof. The most preferable reactive solvent is ethyleneglycol. The preferable amount of the reactive solvent is from about 0.1 to about 20 weight parts based on 100 weight parts of the polymer, and the same amount of the reactive solvent with that of the lithium salt can be used more preferably. If the amount of the reactive solvent is less than 0.1 weight parts based on 100 weight parts of the polymer, the lithium salt cannot be sufficiently dissolved with the reactive solvent. On the contrary, if the amount of the reactive solvent is more than 20 weight parts, the physical properties of polymer can be deteriorated. The reactive solvent in which the lithium salt is dissolved is added to the polyurethane polymerization process to uniformly distribute the lithium salt. By using the reactive solvent which participates in urethane polymerization reaction for dissolving the lithium salt, the elution of electrolyte solvent and other organic compounds is minimized when the produced polymer is processed at high temperature or when the produced polymer is used for long time. Therefore, the polymer produced according to the present invention does not badly effect on the properties of the product packaged with the polymer, and maintains stable antistatic property.

The electrostatic dissipative polymer produced according to the present invention does not limited to polyurethane, but also includes glycol modified polyethyleneterephthalate (PETG), polypropylene, polyethylene, polystyrene, polyvinyl chloride, polyester, acrylonitrile-butadiene-styrene, the mixtures thereof, or so on, and the blend according to the present invention can be produced by blending the electrostatic dissipative polymer with a conventional thermoplastic polymer. The electrostatic dissipative polymer and the blend can be used as a packaging material or other various materials having antistatic property.

Hereinafter, the preferable examples of the present invention and comparative examples are provided for better understanding of the present invention. The following examples are to illustrate the present invention, and the present invention is not limited by the following examples.

EXAMPLES 1-2, COMPARATIVE EXAMPLES 1-2

Preparation of ESD Polymer and Blend of a Thermoplastic Polymer and the ESD Polymer As shown in Table 3, lithium(bis)perfluoroethanesulfonimide ($LiN(SO_2C_2F_5)_2$) was dissolved with ethylene carbonate or ethyleneglycol($C_2H_6O_2$). The lithium salt solutions were added to the polymerization reaction of SKYTHANE P-008 which is commercially available polyurethane of SK Chemicals Co., Ltd. of Republic of Korea. In the polymerization reactions of Examples and Comparative Examples, the amounts of polyethyleneglycol were maintained constantly to maintain the electrostatic dissipative properties of the base polyurethane constantly. Therefore, in Examples and Comparative Examples, the electrostatic dissipative properties of the produced polyurethane depend only on the amounts of lithium salt and the reactive solvent. The produced polyurethane was blended with SKYGREEN PETG which is commercially available glycol modified polyethyleneterephthalate of SK Chemicals Co., Ltd. according to the conditions shown in Table 1.

TABLE 1

| | Conditions |
|---|---|
| Blending equipment | Twin screw extruder, D = 70 mm, L/D = 36 |
| Temperatures of Barrel | 170/180/180/180/180/180/180/180/180° C. |
| Screw rate | 250 rpm |
| Feed rate | 250 kg/hr |
| Temperature of polymer | 185° C. |

The produced blends were processed to form sheets of thickness of 1 mm with a single screw extruder, and the processing conditions are set forth in Table 2.

TABLE 2

| | Condition |
|---|---|
| Processing equipment | Single screw extruder, D = 45 mm, L/D = 33 |
| Temperatures of Barrel | 170/185/185/185/185/185/185/185° C. |
| Screw rate | 60 rpm |
| Feed rate | 80 kg/hr |
| Temperature of polymer | 185° C. |

Electrical characteristics of the produced sheets were measured, and the results are set forth in Table 3.

TABLE 3

| Samples | Comparative example 1 | Comparative example 2 | Example 1 | Example 2 |
|---|---|---|---|---|
| Amount of LiN(SO$_2$C$_2$F$_5$)$_2$ (Weight part) | 0.25 | 0.50 | 0.25 | 0.50 |
| Amount of Ethylene carbonate (Weight part) | 0.25 | 0.50 | 0 | 0 |
| Amount of ethyleneglycol (Weight part) (ASTM D-257) | 0 | 0 | 0.25 | 0.50 |
| Surface resistivity(Ω/square) | $1.8 \times 10^{10}$ | $1.8 \times 10^{9}$ | $2.1 \times 10^{10}$ | $1.4 \times 10^{9}$ |
| Volume resistivity(Ω · cm) (FTMS-101C) | $5.9 \times 10^{10}$ | $5.3 \times 10^{9}$ | $6.7 \times 10^{10}$ | $5.8 \times 10^{9}$ |
| Static decay time (sec.) | 0.2 | 0.1 | 0.2 | 0.1 |

In Table 3, "Static decay time" is the time during a test piece of 1000 V is discharged to 10V, and was measured in accordance with FTMS-101C regulation. "Surface resistivity" and "Volume resistivity" are measured after leaving a test piece for 40 hours at the temperature of 23±1° C. and at the relative humidity of 50±5% in accordance with ASTM D-257. The amounts of lithium salt and the solvent for dissolving lithium salt is based on 100 weight parts of the produced polymer.

As shown in Table 3, when the same amount of lithium salt is used, the electrical properties of the produced polymers are similar and are not significantly affected by the type of the solvents.

EXPERIMENTAL EXAMPLES

Elusion of Solvent from ESD Polymer

Polymer sheets produced according to Examples 1-2 and Comparative Examples 1-2 were cut by 50 mm×50 mm size, and were kept in a Teflon container at 90° C. for 4 hours, respectively. Then, the elusion of solvent was measured with Gas chromatography/Mass spectrometry (Agillent, Model 6890N/59731). The eluted organic compounds and their amounts are set forth in Table 4.

TABLE 4

| | Comparative Example 1 | Comparative Example 2 | Example 1 | Example 2 |
|---|---|---|---|---|
| LiN(SO$_2$C$_2$F$_5$)$_2$ | 0.25 | 0.50 | 0.25 | 0.50 |
| Ethylene carbonate | 0.25 | 0.50 | 0 | 0 |
| Ethyleneglycol | 0 | 0 | 0.25 | 0.50 |
| Organic compounds and eluted amount(ng/g) | | | | |
| Hydrocarbon | 140.8 | 193.0 | 110.8 | 117.9 |
| Ethylene carbonate | 74.2 | 160.6 | ND | ND |
| Phenol/Alcohol | 88.7 | 91.3 | 51.6 | 56.0 |

In Table 4, "ND" represents "not detected". As shown in Table 4, the organic compounds, such as hydrocarbons, ethylene carbonate, and phenol/alcohol, were eluted from the blends of Examples 1-2 and Comparative Examples 1-2, and the amounts of the eluted organic compounds significantly decrease when ethyleneglycol was used for dissolving lithium salt. Therefore, the polymer blend which uses ethylene carbonate for dissolving lithium salts, may badly affect on the packaged product due to the eluted organic compounds, but the polymer blend which uses ethyleneglycol for dissolving lithium salts, reduces such disadvantages.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A method for preparing an electrostatic dissipative polymer, comprising the step of polymerizing polyethyleneglycol, diisocyanate, and a chain extender, resulting in the electrostatic dissipative polymer, where the polymerizing reaction takes place in the presence of a reactive solvent and where a lithium salt is dissolved in the reactive solvent,
    wherein the amount of the reactive solvent is from 0.1 to 20 weight parts based on 100 weight parts of the produced electrostatic dissipative polymer, the amount of lithium salt is from 0.1 to 5 weight parts based on 100 weight parts of the produced electrostatic dissipative polymer, and
    wherein the reactive solvent consists essentially of an aliphatic glycol having from 2 to 8 carbon atoms and having a primary alcohol group, or an aromatic glycol having from 6 to 10 carbon atoms;
    wherein the electrostatic dissipative polymer is polyurethane.

2. The method for preparing an electrostatic dissipative polymer according to claim 1, wherein the reactive solvent is a solvent selected from the group consisting of ethyleneglycol, diethyleneglycol, 1,3-propanediol, 1,4-butanediol, 1,3- pentanediol, 1,4-cyclohexanedimethan-ol, hydroquinone bis(di-hydroxyethyl)ether, 1,6-hexanediol and the mixtures thereof.

3. The method for preparing an electrostatic dissipative polymer according to claim 1, wherein the lithium salt is selected from the group consisting of $LiN(SO_2C_2F_5)_2$, $LiClO_4$, $LiN(CF_3SO_2)_2$, $LiPF_8$, $LiAsF_6$, LiI, LiBr, LiSCN, $LiSO_3CF_3$, $LiNO_3$, $LiC(SO_2CF_3)_3$, $Li_2S$, $LiMR_4$, and the mixtures thereof, and wherein M is Al or B, R is halogen, alkyl or alyl group.

4. The method for preparing an electrostatic dissipative polymer according to claim 1, wherein the step of polymerizing the polyurethane is carried out in the presence of a chain extender selected from the group consisting of diethyleneglycol, 1,3-propanediol, 1,4-butanediol, 1,5-pentanediol, 1,4-cyclohexanedimethanol, hydroquinone bis(dihydroxyethyl) ether, 1,6-hexanediol and the mixtures thereof.

5. The method for preparing an electrostatic dissipative polymer according to claim 4, wherein the amount of the chain extender is from 0.1 to 15.0 moles for 1 mole of polyethyleneglycol which is used for polyurethane polymerization.

6. The method for preparing an electrostatic dissipative polymer according to claim 1, wherein the electrostatic dissipative polymer may further comprise a polymer selected from the group consisting of glycol modified polyethyleneterephthalate, polypropylene, polyethylene, polystyrene, polyvinyl chloride, polyester, acrylonitrile-butadiene-styrene and the mixtures thereof.

7. A method for preparing an electrostatic dissipative polymer blend, comprising the steps of:
(1) polymerizing polyethyleneglycol, diisocyanate, and a chain extender, resulting in an electrostatic dissipative polymer, where the polymerizing reaction takes place in the presence of a reactive solvent and where a lithium salt is dissolved in the reactive solvent, wherein the amount of the reactive solvent is from 0.1 to 20 weight parts based on 100 weight parts of the produced electrostatic dissipative polymer, the amount of lithium salt is from 0.1 to 5 weight parts based on 100 weight parts of the produced electrostatic dissipative polymer, and
wherein the reactive solvent consists essentially of an aliphatic glycol having from 2 to 6 carbon atoms and a primary alcohol group, or an aromatic glycol having from 6 to 10 carbon atoms; and
(2) blending the electrostatic dissipative polymer with a thermoplastic polymer;
resulting in the electrostatic dissipative polymer blend.

8. A method for preparing an electrostatic dissipative polymer, comprising the step of polymerizing polyethyleneglycol, diisocyanate, and a chain extender, resulting in the electrostatic dissipative polymer in a mixture that consists essentially of components to be polymerized to form the electrostatic dissipative polymer, a reactive solvent and a lithium salt dissolved in the reactive solvent,
wherein the amount of the reactive solvent is from 0.1 to 20 weight parts based on 100 weight parts of the produced electrostatic dissipative polymer, the amount of lithium salt is from 0.1 to 5 weight parts based on 100 weight parts of the produced electrostatic dissipative polymer, and
wherein the reactive solvent consists essentially of an aliphatic glycol having from 2 to 8 carbon atoms and having a primary alcohol group, or an aromatic glycol having from 6 to 10 carbon atoms;
wherein the electrostatic dissipative polymer is polyurethane.

9. A method for preparing an electrostatic dissipative polymer blend, comprising the steps of:
(1) carrying out a polymerizing reaction in a mixture that consists essentially of polyethyleneglycol, diisocyanate, and a chain extender, a reactive solvent and lithium salt dissolved in the reactive solvent, wherein the amount of the reactive solvent is from 0.1 to 20 weight parts based on 100 weight parts of the produced electrostatic dissipative polymer, the amount of lithium salt is from 0.1 to 5 weight parts based on 100 weight parts of the produced electrostatic dissipative polymer, and
wherein the reactive solvent consists essentially of an aliphatic glycol having from 2 to 6 carbon atoms and a primary alcohol group, or an aromatic glycol having from 6 to 10 carbon atoms; and
(2) blending the electrostatic dissipative polymer with a thermoplastic polymer;
resulting in the electrostatic dissipative polymer blend.

* * * * *